(12) United States Patent
Takahashi (10) Patent No.: US 7,883,759 B2
(45) Date of Patent: Feb. 8, 2011

(54) HONEYCOMB STRUCTURE AND METHOD FOR MANUFACTURING HONEYCOMB STRUCTURE

(75) Inventor: Tomohisa Takahashi, Gifu (JP)

(73) Assignee: Ibiden Co., Ltd., Gifu (JP)

( * ) Notice: Subject to any disclaimer, the term of this patent is extended or adjusted under 35 U.S.C. 154(b) by 834 days.

(21) Appl. No.: 11/698,118

(22) Filed: Jan. 26, 2007

(65) Prior Publication Data

US 2007/0178275 A1    Aug. 2, 2007

(30) Foreign Application Priority Data

Jan. 27, 2006   (JP) .............................. 2006-019692
Nov. 20, 2006   (WO) ................. PCT/JP2006/323125

(51) Int. Cl.
*B32B 3/12* (2006.01)

(52) U.S. Cl. ..................................................... 428/116

(58) Field of Classification Search ................... 428/116
See application file for complete search history.

(56) References Cited

U.S. PATENT DOCUMENTS

| | | | |
|---|---|---|---|
| 3,876,556 A * | 4/1975 | Laack et al. ................... 502/1 |
| 4,455,336 A | 6/1984 | Ogawa et al. |
| 5,914,187 A | 6/1999 | Naruse et al. |
| 6,669,751 B1 * | 12/2003 | Ohno et al. .................... 55/523 |
| 7,396,586 B2 | 7/2008 | Ohno et al. |
| 2002/0004454 A1 * | 1/2002 | Domesle et al. ............. 502/439 |
| 2004/0055265 A1 | 3/2004 | Ohno et al. |
| 2004/0161596 A1 | 8/2004 | Taoka et al. |
| 2005/0025933 A1 * | 2/2005 | Masukawa et al. .......... 428/116 |
| 2005/0076626 A1 | 4/2005 | Kudo et al. |
| 2005/0109023 A1 | 5/2005 | Kudo et al. |
| 2005/0153099 A1 | 7/2005 | Yamada |
| 2005/0160710 A1 | 7/2005 | Taoka et al. |
| 2005/0161849 A1 | 7/2005 | Ohno et al. |
| 2005/0169819 A1 | 8/2005 | Shibata |
| 2005/0175514 A1 | 8/2005 | Ohno |
| 2005/0178098 A1 | 8/2005 | Ono et al. |
| 2005/0180898 A1 | 8/2005 | Yamada |
| 2005/0229565 A1 | 10/2005 | Yoshida |
| 2005/0247038 A1 | 11/2005 | Takahashi |
| 2005/0266992 A1 | 12/2005 | Ohno et al. |
| 2005/0272602 A1 | 12/2005 | Ninomiya |
| 2006/0021310 A1 | 2/2006 | Ohno et al. |
| 2006/0051556 A1 | 3/2006 | Ohno et al. |

(Continued)

FOREIGN PATENT DOCUMENTS

EP    1 632 657    3/2006

(Continued)

OTHER PUBLICATIONS

U.S. Appl. No. 11/760,037.

(Continued)

*Primary Examiner*—Gordon R Baldwin
(74) *Attorney, Agent, or Firm*—Finnegan, Henderson, Farabow, Garrett & Dunner, L.L.P.

(57) ABSTRACT

A honeycomb structure has a longitudinal axis, a ceramic structure extending along the longitudinal axis and having a large number of cells partitioned by a partition, and a coating layer arranged on an outer surface of the ceramic structure. The main component of the coating layer is molten inorganic oxide.

8 Claims, 3 Drawing Sheets

U.S. PATENT DOCUMENTS

| | | | |
|---|---|---|---|
| 2006/0101747 A1 | 5/2006 | Masukawa et al. | |
| 2006/0105139 A1 | 5/2006 | Suwabe et al. | |
| 2006/0121240 A1 | 6/2006 | Hirai et al. | |
| 2006/0166820 A1 | 7/2006 | Ogyu et al. | |
| 2006/0210765 A1 | 9/2006 | Ohno et al. | |
| 2006/0216466 A1 | 9/2006 | Yoshida | |
| 2006/0216467 A1 | 9/2006 | Yoshida | |
| 2006/0222812 A1 | 10/2006 | Koyama et al. | |
| 2006/0225390 A1 | 10/2006 | Yoshida | |
| 2006/0228519 A1* | 10/2006 | Kato | 428/116 |
| 2006/0230732 A1 | 10/2006 | Kunieda | |
| 2007/0009707 A1 | 1/2007 | Ogura et al. | |
| 2007/0020155 A1 | 1/2007 | Ohno et al. | |
| 2007/0068128 A1 | 3/2007 | Oshimi et al. | |
| 2007/0196620 A1 | 8/2007 | Ohno et al. | |
| 2007/0212517 A1 | 9/2007 | Ohno et al. | |
| 2007/0293392 A1 | 12/2007 | Ohno et al. | |
| 2008/0120950 A1 | 5/2008 | Ohno et al. | |
| 2008/0136062 A1 | 6/2008 | Kasai et al. | |
| 2008/0174039 A1 | 7/2008 | Saijo et al. | |
| 2008/0197544 A1 | 8/2008 | Saijo et al. | |
| 2008/0211127 A1 | 9/2008 | Naruse et al. | |
| 2008/0213485 A1 | 9/2008 | Shibata | |
| 2008/0236115 A1 | 10/2008 | Sakashita | |
| 2008/0236724 A1 | 10/2008 | Higuchi | |
| 2008/0237942 A1 | 10/2008 | Takamatsu | |
| 2008/0241015 A1 | 10/2008 | Kudo et al. | |
| 2008/0284067 A1 | 11/2008 | Naruse et al. | |
| 2008/0305259 A1 | 12/2008 | Saijo | |
| 2008/0318001 A1 | 12/2008 | Sakakibara | |
| 2009/0004431 A1 | 1/2009 | Ninomiya | |
| 2009/0079111 A1 | 3/2009 | Kasai et al. | |
| 2009/0107879 A1 | 4/2009 | Otsuka et al. | |
| 2009/0130378 A1 | 5/2009 | Imaeda et al. | |
| 2009/0199953 A1 | 8/2009 | Sato | |
| 2009/0202402 A1 | 8/2009 | Sato | |
| 2009/0220735 A1 | 9/2009 | Mizuno et al. | |

FOREIGN PATENT DOCUMENTS

| | | |
|---|---|---|
| EP | 1704908 | 9/2006 |
| EP | 1757351 | 2/2007 |
| EP | 1 769 838 | 4/2007 |
| EP | 1 775 008 | 4/2007 |
| EP | 1 787 702 | 5/2007 |
| EP | 1 787 969 | 5/2007 |
| JP | 59-152215 | 8/1984 |
| JP | 2004-231506 | 8/2004 |
| JP | 2005-349378 | 12/2005 |
| WO | WO 03/067041 A1 | 8/2003 |
| WO | WO 03/106028 | 12/2003 |
| WO | WO 2005/047209 A1 | 5/2005 |
| WO | WO 2006/035822 | 4/2006 |
| WO | WO 2006/035823 | 4/2006 |
| WO | WO 2006/041174 | 4/2006 |
| WO | WO 2006/057344 | 6/2006 |
| WO | WO 2006/070504 | 7/2006 |
| WO | WO 2006/082938 | 8/2006 |
| WO | WO 2006/082940 | 8/2006 |
| WO | WO 2006/087932 | 8/2006 |
| WO | WO 2006/117899 | 11/2006 |

OTHER PUBLICATIONS

U.S. Appl. No. 11/927,091.
U.S. Appl. No. 11/874,790.
U.S. Appl. No. 11/851,300.
U.S. Appl. No. 11/925,459.
U.S. Appl. No. 11/932,469.
International Search Report and Written Opinion of International Searching Authority.
Communication and Search Report mailed Jun. 18, 2007, from the European Patent Office.
International Bureau, Notification of Transmittal of International Preliminary Report, dated Aug. 7, 2008, International Application No. PCT/JP2006/323125 (5 pgs.).
U.S. Appl. No. 12/369,876, filed Feb. 12, 2009, to Hiroki Sato, entitled "Method for Manufacturing Honeycomb Structure," published as U.S. Patent Application Publication No. 2009/0199953 A1, which claims priority to PCT/JP2008/052375, filed Feb. 13, 2008.
U.S. Appl. No. 12/363,396, filed Jan. 30, 2009, to Hiroki Sato, entitled "Honeycomb Structure, Exhaust Gas Purifying Apparatus and Method For Manufacturing Honeycomb Structure," published as U.S. Patent Application Publication No. 2009/0202402 A1, which claims priority to PCT/JP2008/052374, filed Feb. 13, 2008.
U.S. Appl. No. 12/334,226, filed Dec. 12, 2008, to Hideaki Mizuno et al., entitled "Sealing Material For Honeycomb Structure, Honeycomb Structure and Method For Manufacturing Honeycomb Structure," published as U.S. Patent Application Publication No. 2009/0220735 A1, which claims priority to PCT/JP2008/053638, filed Feb. 29, 2008.
U.S. Appl. No. 12/400,389, to Takehiro Higuchi, entitled "Honeycomb Structure and Method For Manufacturing Honeycomb Structure," which claims priority to PCT/JP2008/055461, filed Mar. 24, 2008.
U.S. Appl. No. 12/342,903, to Kazushige Ohno, entitled "Honeycomb Filter, Exhaust Gas Purifying Apparatus and Method For Manufacturing Honeycomb Filter," which claims priority to PCT/JP2008/055462, filed Dec. 23, 2008.
U.S. Appl. No. 12/393,200, to Takamitsu Saijo, entitled "Method For Manufacturing Honeycomb Structure," which claims priority to PCT/JP2008/055937, filed Mar. 27, 2008.
U.S. Appl. No. 12/411,148, to Yuichi Hiroshima, entitled "Stopping Member, Firing Furnace, and Method For Manufacturing Honeycomb Structure," which claims priority to PCT/JP2008/055938, filed Mar. 27, 2008.
U.S. Appl. No. 11/967,783, to Takamitsu Saijo et al., filed Dec. 31, 2007, (now abandoned), published as US-2008/0197544 A1.
U.S. Appl. No. 12/029,242, to Shoji Takamatsu, filed Feb. 12, 2008, published as US-2008/0237942 A1.
U.S. Appl. No. 12/235,296 to Matsuo Otsuka et al., filed Sep. 22, 2008, published as US-2009/0107879 A1.
U.S. Appl. No. 12/250,633, to Masahi Imaeda et al., filed Oct. 14, 208, published as US-2009/0130378 A1.

* cited by examiner

HONEYCOMB STRUCTURE AND METHOD FOR MANUFACTURING HONEYCOMB STRUCTURE

CROSS-REFERENCE TO RELATED APPLICATIONS

This application is based upon and claims the benefit of priority from prior Japanese Patent Application No. 2006-019692, filed on Jan. 27, 2006 and International Patent Application No. PCT/JP2006/323125, filed on Nov. 20, 2006. The entire contents of both of the prior applications are incorporated herein by reference.

BACKGROUND OF THE INVENTION

The present invention relates to a honeycomb structure, and to a method for manufacturing the honeycomb structure.

In recent years, environmental considerations have increased the necessity for removing particulate matter in exhaust gases from combustion apparatuses, such as internal combustion engines and boilers. In particular, regulations relating to removal of particulate matter (PM) including graphite particles discharged from diesel engines are being strengthened in Europe, the United States, and Japan. A honeycomb structure referred to as a diesel particulate filter (DPF) has been used as a filter for capturing and removing substances such as PM. A honeycomb structure is accommodated in a casing that is arranged in an exhaust passage of a combustion apparatus. The honeycomb structure has a large number of cells that extend in the longitudinal direction of the structure. The cells are partitioned by partitions. In every pair of adjacent cells, one cell has an open end on one side and the other cell has an open end on the opposite side. The open end of one cell and the open end of the other cell are sealed by a plug. Plugs are arranged in a lattice on each end surface (inlet side end surface and outlet side end surface) of the honeycomb structure. Exhaust gas enters open cells at the inlet side end surface of the honeycomb structure, flows through the porous partitions, and is discharged from adjacent open cells at the outlet side end surface. For example, PM discharged from a diesel engine is captured by the partitions that function as a particle capturing filter, and accumulates on the partitions. The PM accumulating on the partitions is burned and removed by a heating means, such as a burner or a heater, or by heat from the exhaust gas.

WO 2003/067041A describes a ceramic structure that is formed by joining a plurality of porous ceramic members with a bonding agent. The outer surface of the ceramic structure is coated by a coating layer for preventing leakage of exhaust gas. The coating layer is formed by hardening a coating agent containing inorganic fibers such as silica-alumina fibers (10 to 70 mass %), inorganic particles such as silicon carbide (3 to 80 mass %), an inorganic binder such as a silica sol (1 to 15 mass %), and an organic binder such as carboxymethyl cellulose (0.1 to 5 mass %).

WO 2005/047209A describes a honeycomb structure using a coating agent containing a particulate filler in addition to ceramics as its main component.

The entire contents of WO 2003/067041A and WO 2005/047209A are incorporated herein by reference.

SUMMARY OF THE INVENTION

A honeycomb structure according to the present invention includes a longitudinal axis, a ceramic structure extending along the longitudinal axis and having a large number of cells partitioned by a partition, and a coating layer arranged on an outer surface of the ceramic structure, and is characterized in that the coating layer contains molten inorganic oxide as a main component.

In the honeycomb structure, it is preferred that the content of the molten inorganic oxide in the coating layer is about 55 to about 95 mass %.

In the honeycomb structure, it is preferred that the molten inorganic oxide comprises one selected from the group consisting of molten silica, molten alumina, molten titania, and molten zirconia.

In the honeycomb structure, it is preferred that the molten inorganic oxide comprises at least either one of molten silica and molten alumina.

In the honeycomb structure, it is preferred that the molten inorganic oxide has an average particle diameter of about 20 to about 100 μm.

In the honeycomb structure, it is preferred that the molten inorganic oxide has a cross-section with circularity of about 0.9 or more.

In the honeycomb structure, it is preferred that the ceramic structure includes a plurality of porous ceramic members joined together by a bonding agent layer.

In the honeycomb structure, it is preferred that the ceramic structure is formed from a single porous ceramic member.

In the honeycomb structure, it is preferred that the ceramic structure is formed by bonding with a bonding agent a first plurality of porous ceramic members for forming a central portion of the ceramic structure and a second plurality of porous ceramic members for forming an outer portion of the ceramic structure.

In the honeycomb structure, it is preferred that each cell has openings in the two end surfaces, with one of the openings in each cell being sealed, and the partition functions as a particle capturing filter.

A method for manufacturing a honeycomb structure according to the present invention includes the steps configured to prepare a coating agent containing a molten inorganic oxide, a binder, and a solvent; apply the coating agent to an outer surface of a ceramic structure including a longitudinal axis and a ceramic structure extending along the longitudinal axis and having a large number of cells partitioned by a partition; and form a coating layer by hardening the coating agent, and is characterized in that the coating agent contains the molten inorganic oxide as a main component.

In the method, it is preferred that the content of the molten inorganic oxide in the coating agent is about 40 to about 70 mass %.

In the method, it is preferred that the molten inorganic oxide comprises one selected from the group consisting of molten silica, molten alumina, molten titania, and molten zirconia.

In the method, it is preferred that the molten inorganic oxide comprises at least either one of molten silica and molten alumina.

In the method, it is preferred that the molten inorganic oxide has an average particle diameter of about 20 to about 100 μm.

In the method, it is preferred that the molten inorganic oxide has a cross-section with circularity of about 0.9 or more.

It is preferred that the method further including the step configured to join a plurality of porous ceramic members with a bonding agent layer to form the ceramic structure.

It is preferred that the method further including the step configured to joined together a first plurality of porous ceramic members having a predetermined shape and a second plurality of porous ceramic members having a predetermined shape by a bonding agent layer to form the ceramic structure, wherein a central portion of the ceramic structure is formed by the first plurality of porous ceramic members and an outer portion of the ceramic structure is formed by the second plurality of porous ceramic members.

In the method, it is preferred that the ceramic structure has two end surfaces, and each cell has openings in the two end surfaces, the method further characterized by the step configured to seal one of the openings of each cell so that the partition functions as a particle capturing filter.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

BEST MODE FOR CARRYING OUT THE INVENTION

One embodiment according to the present invention proposes a honeycomb structure that includes a longitudinal axis, a ceramic structure extending along the longitudinal axis and having a large number of cells partitioned by a partition, and a coating layer arranged on an outer surface of the ceramic structure and that the coating layer contains molten inorganic oxide as a main component.

The coating layer contains the molten inorganic oxide as the main component. The molten inorganic oxide functions to prevent the coating layer from partially melting (corroding) due to soot from the exhaust gas. As a result, the strength of the coating layer is prevented from decreasing. Air-bubbles tend not to be formed in the coating layer containing the molten inorganic oxide as the main component. This means that the applicability of the coating agent when the coating agent is applied to the outer surface of the ceramic structure is improved. Since the molten inorganic oxide particles contained in the coating agent are spherical particles having smooth surfaces, the molten inorganic oxide particles easily roll within the coating agent. This enables the coating agent to be uniformly applied to the outer surface of the ceramic structure. As a result, the coating layer can be prevented from peeling.

The molten inorganic oxide means particles prepared by crushing crude material (inorganic oxide) and melting the crushed crude material at a high temperature, such as in high temperature flame, to shape it in a spherical shape by its surface tension.

It is preferred that a content of the molten inorganic oxide in the coating layer be about 55 to about 95 mass %. When the content of the molten inorganic oxide is about 55 to about 95 mass %, a sufficiently large amount of molten inorganic oxide is contained in the coating layer. Thus, the coating layer may be more effectively prevented from melting (corroding) partially.

When the content of the molten inorganic oxide in the coating layer is about 55 to about 95 mass %, the molten inorganic oxide can be homogeneously dispersed in the coating layer. Accordingly, the molten inorganic oxide can be homogeneously dispersed in the coating layer after drying the coating layer. This may suppress generation of localization of the molten inorganic oxide and may improve adhesiveness of the coating layer to the ceramic structure. For example, even when excessive thermal stress is generated in the honeycomb filter by local heat generation during PM burning, the coating layer seldom peels. Further, the functions of the coating layer are maintained in an optimum manner.

It is preferred that the molten inorganic oxide be at least either one of molten silica and molten alumina. When the coating layer contains, as its main component, at least one of molten silica and molten alumina that have significantly crystallized surfaces, the coating layer may be prevented from corroding due to soot from the exhaust gas.

It is preferred that the molten inorganic oxide have an average particle diameter of about 20 to about 100 μm. In this case, the dispersibility of the molten inorganic oxide in the coating layer is improved, and gaps formed between particles of the molten inorganic oxide are reduced. As a result, the coating layer has sufficient strength and high thermal conductivity. Thus, the peeling of the coating layer may be further suppressed.

It is preferred that the molten inorganic oxide have a cross-section with a circularity of about 0.9 or more.

It is preferred that the ceramic structure includes a plurality of porous ceramic members that joined together by a bonding agent layer.

It is preferred that the ceramic structure has two end surfaces, each cell has openings on the two end surfaces, one of the openings of each cell is sealed, and the partition functions as a particle capturing filter.

One embodiment of the present invention provides a method for manufacturing a honeycomb structure including the step configured to prepare a coating agent containing a molten inorganic oxide, a binder, and a solvent; the step configured to apply the coating agent to an outer surface of a ceramic structure including a longitudinal axis and a ceramic structure extending along the longitudinal axis and having a large number of cells partitioned by a partition; and the step configured to form a coating layer by hardening the coating agent. The coating agent contains the molten inorganic oxide as a main component.

The molten inorganic oxide is in the form of spherical particles having smooth surfaces. When the coating agent contains the molten inorganic oxide, the molten inorganic oxide particles easily roll within the coating agent. This improves the applicability of the coating agent when the coating agent is applied to the outer surface of the ceramic structure and enables the coating agent to be uniformly applied to the outer surface of the ceramic structure.

It is preferred that the content of the molten inorganic oxide in the coating agent be about 40 to about 70 mass %. When the content of the molten inorganic oxide in the coating agent is about 40 to about 70 mass %, the applicability of the coating agent is further improved when the coating agent is applied to the outer surface of the ceramic structure, and the coating agent is applied more uniformly to the outer surface of the ceramic structure. When the coating agent is hardened, a binder, a solvent, and other components contained in the coating agent are partially removed from the coating agent through vaporization, burning, reaction, and the like. Thus, the ratio of the molten inorganic oxide in the coating layer formed by hardening the coating agent is higher than the ratio of the molten inorganic oxide in the coating agent. For example, when the content of the molten inorganic oxide in the coating agent is about 40 to about 70 mass %, the content of the molten inorganic oxide in the coating layer is about 55 to about 95 mass %. As a result, air-bubbles are seldom formed in the coating layer formed by hardening the coating agent, and the coating layer functions in an optimum manner.

The coating layer formed by hardening the coating agent, which contains about 40 to about 70 mass % of molten inorganic oxide, ensures a high dispersibility for the molten inorganic oxide and improves adhesiveness of the coating layer to the ceramic structure. For example, even when excessive thermal stress is generated in the honeycomb filter by local heat generation during PM burning, the coating layer seldom peels, and the coating layer functions in an optimum manner.

It is preferred that the molten inorganic oxide be at least either one of molten silica and molten alumina. When the coating agent contains as a main component at least either one of molten silica and molten alumina, which have spherical shapes and have significantly crystallized surfaces, the applicability of the coating agent is further improved.

It is preferred that the molten inorganic oxide have an average particle diameter of about 20 to about 100 μm. When the average particle diameter of the molten inorganic oxide is about 20 to about 100 μm, the solvent contains molten inorganic oxide that is in the form of particles having an optimum surface area and satisfactory rolling characteristics (low rolling resistance). This ensures improvement in the applicability of the coating agent. Further, the particles of the molten inorganic oxide hardly form localized aggregations in the coating agent, and dispersibility of the particles of the molten inorganic oxide in the coating agent is improved. The dispersibility of the molten inorganic oxide in the coating layer formed by hardening the coating agent is also improved. As a result, the coating layer tends to have sufficient strength and thermal conductivity. This may suppress peeling of the coating layer.

It is preferred that the molten inorganic oxide have a cross-section with a circularity of about 0.9 or more. When the molten inorganic oxide has a cross-section with a circularity of about 0.9 or more, the molten inorganic oxide tends to have extremely satisfactory rolling characteristics. This further improves the applicability of the coating agent.

It is preferred that the ceramic structure be formed by joining a plurality of porous ceramic members with a bonding agent layer.

It is preferred that the ceramic structure has two end surfaces, and each cell has openings in the two end surfaces, and the method further includes sealing one of the openings of each cell so that the partition functions as a particle capturing filter.

The ceramic structure may be formed from a single porous ceramic member.

A honeycomb structure according to a preferred embodiment of the present invention will now be described. The honeycomb structure is for application to an exhaust gas purification device for a vehicle. The exhaust gas purification device will first be described. The exhaust gas purification device is of a spontaneous ignition type in which the captured PM is burned and removed with only the heat from exhaust gas. The honeycomb structure may also be applied to other types of exhaust gas purification devices.

Figure 1:
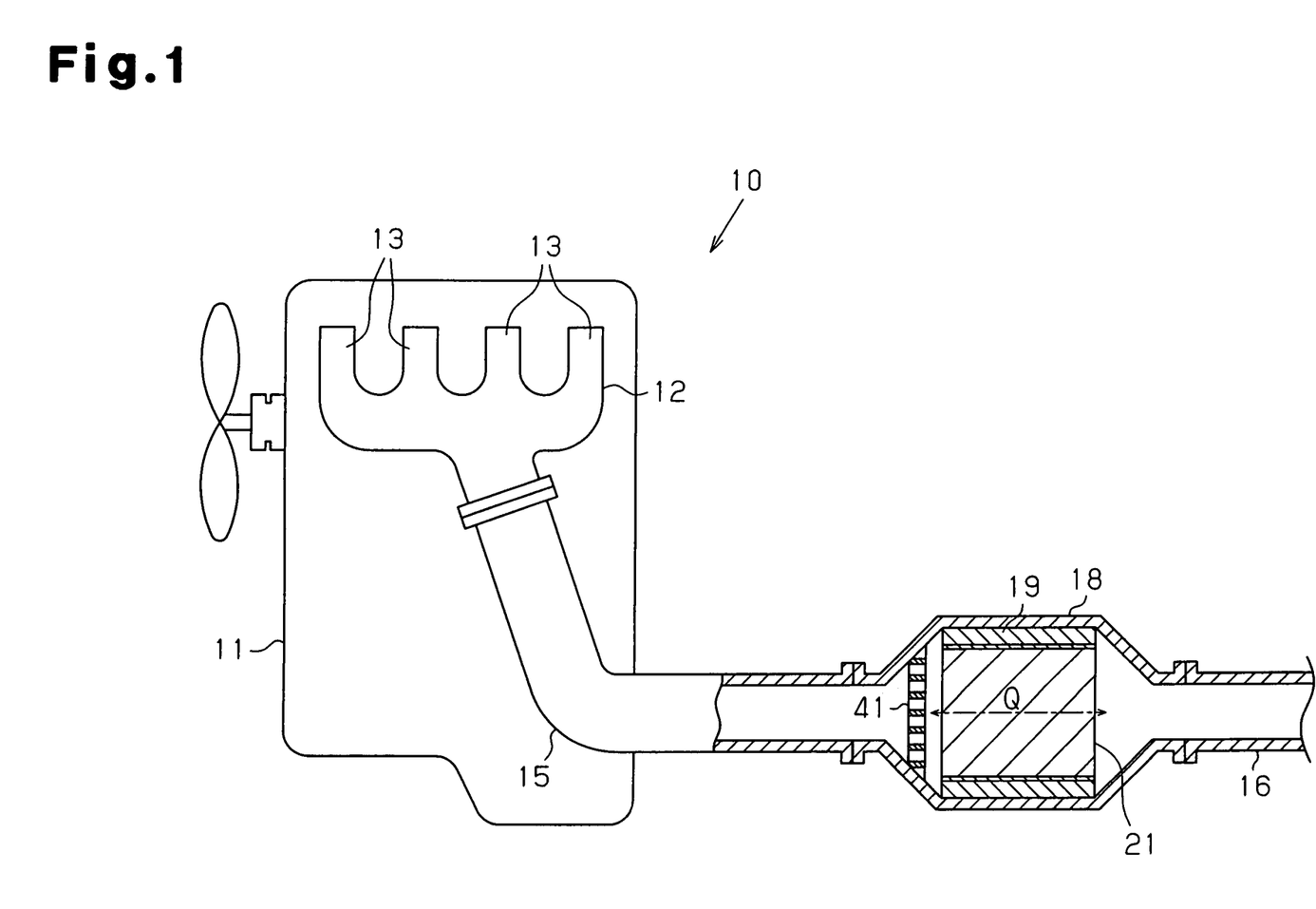
FIG. 1 is a schematic view showing an exhaust gas purification device according to one embodiment of the present invention.

As shown in FIG. 1, an exhaust gas purification device 10 purifies, for example, exhaust gas discharged from a diesel engine 11. The diesel engine 11 includes a plurality of cylinders (not shown). Branch portions 13 of an exhaust manifold 12 made of a metal material are connected to the cylinders.

A first exhaust pipe 15 and a second exhaust pipe 16, which are made of a metal material, are arranged downstream of the exhaust manifold 12. An upstream end of the first exhaust pipe 15 is connected to the manifold 12. A tubular casing 18, which is made of a metal material, is arranged between the first exhaust pipe 15 and the second exhaust pipe 16. An upstream end of the casing 18 is connected to a downstream end of the first exhaust pipe 15. A downstream end of the casing 18 is connected to an upstream end of the second exhaust pipe 16. The interiors of the first exhaust pipe 15, the casing 18, and the second exhaust pipe 16 are in communication with one another, and exhaust gas flows therethrough.

The casing 18 includes a central portion having a diameter larger than that of the exhaust pipes 15 and 16. The casing 18 provides a filter chamber having a larger inner area than that of the exhaust pipes 15 and 16. A honeycomb structure 21 is accommodated in the casing 18. A heat insulator 19, separate from the honeycomb structure 21, is arranged between the outer circumferential surface of the honeycomb structure 21 and the inner circumferential surface of the casing 18. A catalyst carrier 41 is accommodated in the casing 18 upstream of the honeycomb structure 21. The catalyst carrier 41 carries a known oxidation catalyst. Exhaust gas is oxidized in the catalyst carrier 41. Oxidation heat generated during the oxidation is conducted into the honeycomb structure 21 to burn and remove PM in the honeycomb structure 21. In the present specification, the burning and removal of PM is referred to as "PM removal" or "honeycomb filter regeneration".

The honeycomb structure 21 will now be described. In the present specification, the term "cross-sections" of the honeycomb structure 21, a ceramic member 22", and a ceramic structure 23 refer to cross-sections perpendicular to an axis Q of the honeycomb structure 21 (refer to FIG. 1), an axis of the ceramic member 22, and an axis of the ceramic structure 23, respectively.

Figure 2:
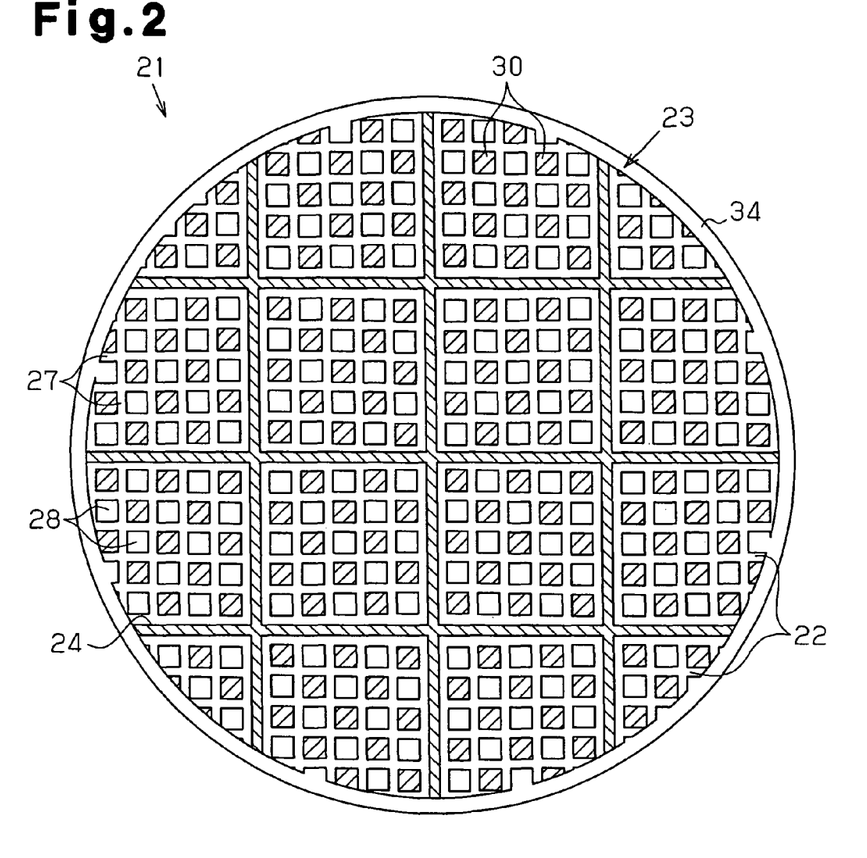
FIG. 2 is a vertical cross-sectional view showing a honeycomb structure according to one embodiment of the present invention.

The honeycomb structure 21 shown in FIG. 2 includes a ceramic structure 23 and a coating layer 34 formed on the outer surface of the ceramic structure 23. The ceramic structure 23 is formed by joining a plurality of (e.g., sixteen) porous ceramic members 22, which have rectangular pillar shapes, into an aggregation with a bonding agent layer 24 and cutting the outer surface of the aggregation into a predetermined shape with a diamond tool or the like. The coating layer 34 is formed by applying a coating agent to the outer surface of the ceramic structure 23. In the example shown in FIG. 2, the outer surface is cut so that some partitions 27 are partially missing and some cells 28 are exposed from the outer surface. The exposed cells 28 are filled with the coating agent when the coating layer 34 is formed. In the present specification, a layer formed by hardening a bonding agent is referred to as the "bonding agent layer 24", and a layer formed by hardening the coating agent is referred to as the "coating layer 34". The porous ceramic members 22 and the coating layer 34 (coating agent) forming the ceramic structure 23 will now be described.

Figure 3:
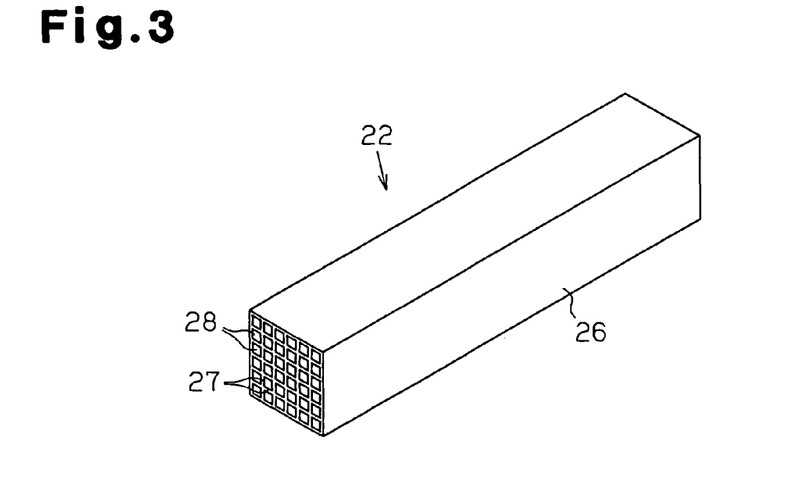
FIG. 3 is a perspective view showing a porous ceramic member used in one embodiment of the present invention.

As shown in FIG. 3, each porous ceramic member 22 includes an outer wall 26 and partitions 27 arranged inward from the outer wall 26. The partitions 27 function as a particle (PM) capturing filter. The ceramic member 22 has a square cross-section. The material for the outer wall 26 and the partitions 27 of the porous ceramic members 22, that is, the main material (main component) for the ceramic structure 23, may be porous ceramic.

Examples of such porous ceramic include ceramic having a low thermal expansion coefficient, such as silicon carbide, zirconium phosphate, aluminum titanate, cordierite, and a silicon carbide-silicon composite. These different kinds of porous ceramic may be used solely or two or more of these kinds may be used in combination. Among these kinds, it is preferable to use one of silicon carbide, zirconium phosphate, aluminum titanate, and a silicon carbide-silicon composite, which have high heat resistance and high melting points.

The partitions 27 may carry an oxidation catalyst composed of, for example, a platinum group element (e.g., Pt) or other metal elements and their oxides. The oxidation catalyst carried by the partitions 27 accelerates the burning of the PM captured on and in the partitions 27.

Figure 4:
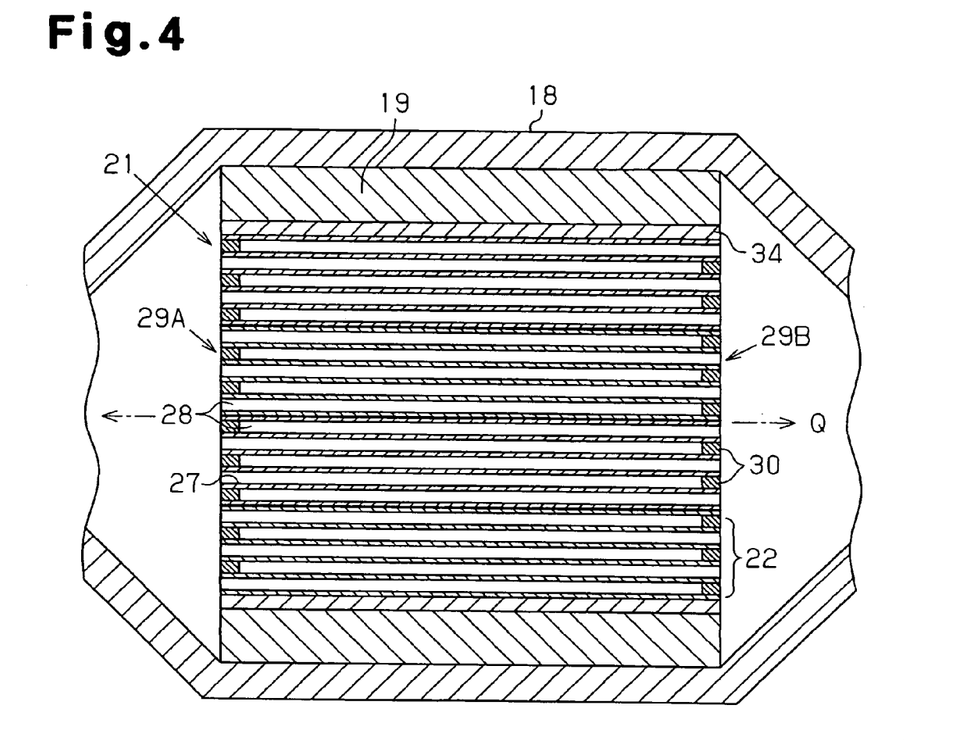
FIG. 4 is a side cross-sectional view showing a honeycomb structure accommodated in a casing.

The porous ceramic member 22 includes a plurality of cells 28 that are partitioned by the partitions 27. As shown in FIG. 4, each cell 28 extends from one end surface (upstream end surface 29A) to another end surface (downstream end surface 29B) along the axis Q (longitudinal axis) and functions as a flow passage for exhaust gas, which serves as a fluid. Each cell 28 has an opening at the end surface 29A and an opening at the end surface 29B. One of the openings of each cell 28 is sealed by a plug 30. A plurality of plugs 30 are arranged in a lattice on each of the end surfaces 29A and 29B. More specifically, about half of the cells 28 open at the upstream end surface 29A, and about half of the remaining cells 28 open at the downstream end surface 29B.

The main material (main component) for the plugs 30 is preferably the same porous ceramic as the material used for the ceramic structure 23 (silicon carbide, cordierite, zirconium phosphate, aluminum titanate, a silicon carbide-silicon composite and the like) so that the plugs 30 have the same characteristics (e.g., thermal expansion coefficient) as the ceramic structure 23. The composition of the bonding agent that may form the bonding agent layer 24 may be the same as or may be different from the composition of the coating agent, which will be described later.

One example of the bonding agent having a composition differing from that of the coating agent is a paste containing an inorganic binder, an organic binder, and inorganic fibers and/or inorganic particles.

Examples of the inorganic binder contained in the bonding agent include a silica sol, an alumina sol, and the like. These different kinds of inorganic binders may be used solely or two or more of these kinds may be used in combination. The preferred inorganic binder is silica sol.

Examples of the organic binder contained in the bonding agent include polyvinyl alcohol, methyl cellulose, ethyl cellulose, carboxymethyl cellulose, and the like. These different kinds of organic binders may be used solely or two or more of these kinds may be used in combination. The preferred organic binder is carboxymethyl cellulose.

Examples of the inorganic fibers contained in the bonding agent include ceramic fibers such as silica-alumina fibers, mullite fibers, alumina fibers, and silica fibers. These different kinds of inorganic fibers may be used solely or two or more of these kinds may be used in combination. The preferred inorganic fibers are alumina fibers.

Examples of the inorganic particles contained in the bonding agent include carbide such as silicon carbide and nitride such as silicon nitride and boron nitride. The inorganic particles are preferably in the form of particles or whisker. These different kinds of inorganic particles may be used solely or two or more of these kinds may be used in combination. Silicon carbide is preferred since it has high thermal conductivity.

A hole forming agent may be added to the bonding agent as necessary. Examples of the hole forming agent include fine hollow spherical bodies such as balloons, spherical acrylic particles, and graphite particles. Preferable examples of balloons include balloons containing oxide ceramic as the main component, such as alumina balloons, glass micro balloons, Shirasu balloons, fly ash (FA) balloons, and mullite balloons. Among these, alumina balloons are particularly preferred.

It is preferred that a bonding agent having the same composition as the coating agent be used so that the bonding agent layer 24 produces the same function as the coating layer 34.

The coating layer 34 will now be described. As shown in FIGS. 2 and 4, the coating layer 34 is formed on the entire outer surface of the ceramic structure 23. The coating layer 34 prevents leakage of exhaust gas from the outer portion of the ceramic structure 23 and also prevents displacement of the honeycomb structure 21 within the casing 18.

The components of the coating agent and the coating layer 34 will now be described. The coating agent and the coating layer 34 differ from each other only in the content of each of their components.

The coating agent contains molten inorganic oxide as the main component and additionally contains a binder and a solvent. In the present specification, the term "main component" refers to the component with the largest content of all the components contained in the coating agent. The molten inorganic oxide serving as the main component improves the applicability of the coating agent and the thermal shock resistance and strength of the coating layer 34. The molten inorganic oxide contained in the coating layer 34 may facilitate prevention of the coating layer 34 from corroding due to soot from the exhaust gas. The molten inorganic oxide is obtained by melting predetermined inorganic oxide particles. Particles of the molten inorganic oxide have crystallized surfaces. The surfaces of the molten inorganic oxide particles are smoother than the surfaces of inorganic oxide particles that are not melted. The circularity of the cross-section of the molten inorganic oxide particle is preferably as close as possible to 1. The most preferable molten inorganic oxide is in the form of spherical particles having circularity of the cross-section of 1.

Examples of the molten inorganic oxide include molten silica, molten alumina, molten titania, molten zirconia, and the like. These different kinds of molten inorganic oxide may be used solely or two or more of these kinds may be used in combination. Among these, molten silica and molten alumina are preferred since they have particularly superior rolling characteristics and significantly crystallized surfaces.

The content of the molten inorganic oxide in the coating agent is about 40 to about 70 mass %, and more preferably about 55 to about 65 mass %. When the content of the molten inorganic oxide in the coating agent is about 40 mass % or more, the applicability of the coating agent may not excessively decrease. The coating layer 34 may have a sufficient thermal shock resistance and a sufficient strength. When the coating agent having low applicability is used, it is difficult to uniformly apply the coating agent to the outer surface of the ceramic structure 23. In this case, air-bubbles are likely to be formed in the coating layer 34. When the content of the molten inorganic oxide is about 70 mass % or less, particles of the molten inorganic oxide may not form aggregation in the solvent. As a result, the dispersibility of the molten inorganic oxide in the coating agent is less likely to decrease. Thus, the adhesiveness of the coating layer 34 to the ceramic structure 23 may be satisfactory, and the coating layer 34 may hardly peel.

When the coating agent is hardened, the binder, the solvent, and other components contained in the coating agent are partially removed from the coating agent through vaporization, burning, reaction, and the like. As a result, the ratio of the molten inorganic oxide in the coating layer 34 formed by hardening the coating agent is higher than the ratio of the molten inorganic oxide in the coating agent. For example, when the content of the molten inorganic oxide in the coating agent is about 40 to about 70 mass %, the content of the molten inorganic oxide in the coating layer 34 is about 55 to about 95 mass %. When the content of the molten inorganic oxide in the coating agent is about 55 to about 65 mass %, the content of the molten inorganic oxide in the coating layer 34 is about 75 to about 90 mass %.

When the content of the molten inorganic oxide in the coating layer 34 is about 55 mass % or more, many air-bubbles may be less likely to be formed in the coating layer 34. In this case, the thermal shock resistance and the strength of the coating layer 34 may not decrease. Further, the coating layer 34 may not corrode partially due to soot from the exhaust gas. When the content of the molten inorganic oxide in the coating layer 34 is about 95 mass % or less, the dispersibility of the molten inorganic oxide in the coating layer 34 may not decrease. This may cause the coating layer 34 to hardly peel.

The average particle diameter of the molten inorganic oxide in the coating agent (coating layer 34) is about 20 to about 100 μm, more preferably about 30 to about 80 μm, and most preferably about 30 to about 50 μm. When the average particle diameter of the molten inorganic oxide is about 20 μm or more, the particle diameter of the molten inorganic oxide particles is not extremely small. In this case, the entire surface area of the molten inorganic oxide particles is not so large, the molten inorganic oxide particles are less likely to form aggregation. In this case, the coating agent is easy to apply. In addition, the molten inorganic oxide may function sufficiently and may ensure sufficiently high thermal shock resistance and sufficiently high strength of the coating layer 34. When the average particle diameter of the molten inorganic oxide is about 100 μm or less, the particle diameter of the molten inorganic oxide particles is not extremely large. Such molten inorganic oxide particles hardly separate from other components. As a result, the adhesiveness of the coating layer 34 may not decrease. In addition, the particles of the molten inorganic oxide may be less likely to form localized aggregations in the coating layer 34, and the dispersibility of the molten inorganic oxide in the coating layer 34 may not decrease. As a result, the coating layer 34 may have sufficient strength and sufficient thermal conductivity.

The circularity of the cross-section of the molten inorganic oxide particle contained in the coating agent (coating layer 34) is preferably about 0.9 or more, and more preferably about 0.95 or more to ensure satisfactory rolling characteristics of the molten inorganic oxide and improve the applicability of the coating agent. In the present specification, the term "circularity of the cross-section (or simply circularity)" is a value expressed using equation 1 shown below. A circle having a circularity of 1 is a perfect circle.

$$\text{Circularity} = (4\pi \times \text{cross-sectional area})/(\text{length of circumference of the cross-section})^2 \quad (1)$$

Molten inorganic oxide particles having a cross-section with a circularity of about 0.9 or more have excellent rolling characteristics (particles are easy to roll) and increases the applicability of the coating agent.

The coating agent contains the binder to strengthen bonding between the ceramic structure 23 and the coating layer 34. The binder may be an inorganic binder or an organic binder. Examples of the inorganic binder include a silica sol, an alumina sol, a titania sol, and the like. Examples of the organic binder include hydrophilic organic polymers, such as carboxymethyl cellulose (CMC), polyvinyl alcohol, methyl cellulose, and ethyl cellulose. These different kinds of binders may be used solely or two or more of these kinds may be used in combination. Among these, silica sol and carboxymethyl cellulose (CMC) are preferred since they easily ensure a sufficiently high bonding strength of the coating layer 34.

The content of the binder in the coating agent is about 10 to about 20 mass %, and more preferably about 10 to about 15 mass %. When the content of the binder is about 10 mass % or more, the coating layer 34 may be easy to have a sufficiently high bonding strength. When the content of the binder in the coating agent exceeds about 20 mass %, the bonding strength of the coating layer 34 does not increase anymore. Thus, the binder content exceeding about 20 mass % is wasteful and not economical. Further, the thermal conductivity of the coating layer 34 may decrease when the content of the binder exceeds 20 mass %. Thus, it is preferred that the binder content is about 20 mass % or less.

As described above, the binder contained in the coating agent is partially removed from the coating agent through vaporization, burning, reaction, and the like. The ratio of the binder in the coating layer 34 formed by hardening the coating agent is lower than the ratio of the binder in the coating agent.

The coating agent contains the solvent to impart fluidity to the coating agent and facilitate application of the coating agent. Examples of the solvent include ionized alkaline water (electrolyzed water), pure water, acetone, various alcohols, and the like. These different kinds of the solvent may be used solely or two or more of these kinds may be used in combination.

The content of the solvent in the coating agent is preferably about 10 to about 30 mass %, and more preferably about 15 to about 25 mass %. When the content of the solvent is about 10 mass % or more, the solvent may impart sufficient fluidity to the coating agent. In this case, it is easy to uniformly apply the coating agent to the outer circumferential surface of the ceramic structure 23. When the content of the solvent is about 30 mass % or less, the coating agent does not contain an excessively large amount of solvent. In this case, the coating agent tends not to take a substantially long time to harden. This may not lower operability. Further, such an amount of solvent may not lower the concentration of the coating agent and may not decrease the bonding strength of the coating layer 34.

The solvent contained in the coating agent is removed by vaporization when the coating agent is dried and hardened to form the coating layer 34. As a result, the coating layer 34 contains almost no solvent.

The coating agent (coating layer 34) may contain other components such as ceramics particles. Ceramics particles contained in the coating agent enable the coating layer 34 to have satisfactory thermal conductivity and a higher bonding strength. Examples of the ceramics include silicon carbide, silicon nitride, cordierite, silica, alumina, mullite, zirconia, zirconium phosphate, aluminum titanate, titania, a silicon carbide-silicon composite, and the like. These different kinds of ceramics may be used solely or two or more of these kinds may be used in combination. In the present specification, the term "silica" refers to a material obtained by crushing natural silica stone without melting the natural silica stone, and is referred to as "crushed silica", "silica pieces", "silica flakes", or "unmelted silica". In the present specification, the term "alumina" refers to a material obtained by crushing synthetic alumina without melting the synthetic alumina, and is referred to as "crushed alumina", "alumina pieces", "alumina flakes", or "unmelted alumina". The same applies to "zirconia" and "titania", which are respectively referred to as "crushed zirconia" and "crushed titania".

Unlike the molten inorganic oxide particles, the crushed ceramics particles have rough surfaces and uneven shapes and have a high rolling resistance. Thus, to ensure satisfactory applicability of the coating agent, the content of the crushed ceramics particles in the coating agent is preferably about 40 mass % or less. When the content of crushed ceramics particles is about 40 mass % or less, the applicability of the coating agent may hardly to decrease. If an excessive amount of crushed ceramic particles, such as exceeding about 40 mass %, is used and a reduction reaction occurs between the excessive amount of crushed ceramics particles and inorganic elements contained in soot from the exhaust gas, the excessive amount of crushed ceramic particles may cause acceleration of melting (corroding) of the coating layer 34.

When the coating agent is dried and hardened, the binder, the solvent, and other components contained in the coating agent are partially removed from the coating agent through vaporization, burning, reaction, and the like. Thus, the ratio of the ceramics particles in the coating layer 34 is higher than the ratio of the ceramics particles in the coating agent. More specifically, the content of the ceramics particles in the coating agent being preferably about 40 mass % or less is calculated that the preferred content of the ceramics particles in the coating layer 34 is about 50 mass % or less. When the content of the ceramics particles in the coating layer 34 is about 50 mass % or less, the amount of ceramics particles contained in the coating layer 34 is not excess and many air-bubbles may not be formed in the coating layer 34.

The average particle diameter of the ceramics particles contained in the coating agent (coating layer 34) is preferably about 10 μm or less to facilitate infiltration of ceramics particles into the ceramic structure 23 and to improve the anchor effect of the ceramics particles. When silicon carbide particles are used as the ceramics particles, coarse particles having an average particle diameter of about 1 μm or more and 10 μm or less and fine particles having an average particle diameter of about 0.1 μm or more and less than 10 μm may be used in combination. The use of such ceramics particles with different particle diameters improves the adhesiveness of the coating layer 34 to the ceramic structure 23.

One embodiment of a method for manufacturing the honeycomb structure 21 will now be described.

First, intermediate molded bodies are formed by extrusion molding using, for example, a plunger type extrusion machine, a biaxial screw continuous extrusion machine, or the like. The intermediate molded bodies are then fired to obtain porous ceramic members 22. Sixteen porous ceramic members 22 are joined together to form an aggregation S with a bonding agent (refer to FIG. 5). The outer portion of the aggregation S is cut in a manner that the aggregation S has a circular cross-section (as indicated by the double-dashed line) using, for example, a diamond tool or the like, to obtain a ceramic structure 23. A coating agent is applied to the entire outer surface of the ceramic structure 23. The coating agent is then dried and hardened at a predetermined temperature to form a coating layer 34. This completes the manufacture of the honeycomb structure 21 shown in FIG. 2. Alternatively, a plurality of porous ceramic members 22, each having a predetermined shape (e.g., a rectangular pillar shape), for forming a central portion of the ceramic structure 23 and a plurality of porous ceramic members 22, each having a predetermined shape (e.g., a substantially triangular pillar shape, which is a pillar having a fan-shaped cross-section or sector cross-section, and a substantially trapezoidal pillar shape, which is a pillar having a cross-section surrounded by three straight lines and one curved line) for forming an outer portion of the ceramic structure 23 may be formed through extrusion molding in advance. The porous ceramic members 22 may be joined together by a bonding agent to form a ceramic structure 23.

The molten inorganic oxide contained in the coating agent is in the form of spherical particles having smooth surfaces. The particles of the molten inorganic oxide easily roll within the coating agent. This enables the coating agent to be uniformly applied to the outer surface of the ceramic structure 23. Air-bubbles are subtly formed in the coating layer 34 when the coating agent is hardened to form the coating layer 34. As a result, the coating layer 34 having high strength may be easily formed.

Further, the coating agent contains an optimum amount (about 40 to about 70 mass %) of molten inorganic oxide so that particles of the molten inorganic oxide are dispersed in an optimum manner in the solvent. Thus, the dispersibility of the molten inorganic oxide in the coating agent subtly decreases. As a result, the coating layer 34 containing about 55 to about 95 mass % of molten inorganic oxide and having a sufficiently high adhesiveness may be easily obtained. As a result, the coating layer 34 may be easily prevented from peeling off from the ceramic structure 23.

The particles of the molten inorganic oxide contained in the coating layer 34 have crystallized surfaces. This means that atoms of the molten inorganic oxide particles (e.g., silicon atoms and oxygen atoms in the case of molten silica, or aluminum atoms and oxygen atoms in the case of molten alumina) are strongly bonded to each other. In this case, a reduction reaction is less likely to occur between the molten inorganic oxide and the soot from the exhaust gas. The coating layer 34 may be prevented from partially melting (e.g., a surface portion of the coating layer 34 is prevented from melting). In other words, the coating layer 34 may be prevented from corroding when the exhaust gas is purified. The coating layer 34 may maintain a sufficiently high strength over a long period of time.

In this manner, the formation of air-bubbles in the coating layer 34 and the peeling and corrosion of the coating layer 34 are suppressed. Further, sufficiently high bonding strength of the coating layer 34 may be ensured. As a result, the coating layer 34 functions sufficiently and increases the exhaust gas purification efficiency.

The preferred embodiment has the advantages described below.

(1) The coating layer 34 contains the molten inorganic oxide as the main component. The molten inorganic oxide may suppress air-bubble formation in the coating layer 34, maintain sufficient bonding strength of the coating layer 34, and prevent the coating layer 34 from peeling. Since air-bubble formation in the coating layer 34 is suppressed, the coating agent is easy to be uniformly applied and the coating layer has high applicability. The coating layer 34 containing the molten inorganic oxide as the main component may be prevented from partially melting (or corroding) by soot from the exhaust gas. This may maintain the functions of the coating layer 34 in an optimum manner. The honeycomb structure 21 having the coating layer 34 may prevent, for example, exhaust gas that has not yet been sufficiently purified from being discharged through a gap formed between the coating layer 34 and the ceramic structure 23. This may ensure sufficiently high exhaust gas purification efficiency.

(2) The coating layer 34 preferably contains about 55 to about 95 mass % of molten inorganic oxide as the main component. In this case, the dispersibility of the molten inorganic oxide in the coating layer 34 may be improved, and the adhesiveness of the coating layer 34 to the ceramic structure 23 may be improved. This easily prevents the coating layer 34 from peeling. The coating layer 34 contains a sufficiently large amount of molten inorganic oxide to easily prevent melting (corrosion) of the coating layer 34. This is effective to maintain the functions of the coating layer 34 over a long period of time.

(3) The coating agent contains the molten inorganic oxide as the main component. The molten inorganic oxide is in the form of spherical particles having smooth surfaces. This improves the applicability of the coating agent and enables the coating agent to be uniformly applied to the outer surface of the ceramic structure 23. As a result, air-bubble formation in the coating layer 34 is suppressed. When air-bubble formation in the coating layer 34 is suppressed, the surface of the coating layer 34 becomes smooth. This eliminates the need for applying the coating agent a number of times to smooth the surface of the coating layer 34. A uniform and smooth coating layer 34 is formed by just applying the coating agent for a small number of times. This simplifies the processes for forming the coating layer 34 and easily enables adjustment of the thickness of the coating layer 34 with high accuracy.

(4) The coating agent contains about 40 to about 70 mass % of molten inorganic oxide. This is an optimum amount for enabling particles of the molten inorganic oxide to uniformly disperse without forming aggregation in the solvent. Since the molten inorganic oxide particles are uniformly dispersed in the coating agent without being locally dense and localization of the molten inorganic oxide is reduced or eliminated, the applicability of the coating agent is improved. When the coating agent containing about 40 to about 70 mass % of molten inorganic oxide is used, the coating layer 34 containing about 55 to about 95 mass % of molten inorganic oxide and having a sufficiently high adhesiveness to the ceramic structure 23 is easily obtained. As a result, the coating layer 34 is easily prevented from peeling off from the ceramic structure 23.

(5) It is preferred that the molten inorganic oxide is at least one of molten silica and molten alumina, which have spherical shapes and superior rolling characteristics and have significantly crystallized surfaces. In this case, the applicability of the coating agent is further improved, and the coating layer 34 is easily prevented from corroding due to soot from the exhaust gas.

(6) It is preferred that the average particle diameter of the molten inorganic oxide be 20 to 100 μm. In this case, the molten inorganic oxide particles having optimum surface areas and satisfactory rolling characteristics are contained in the solvent, and the applicability of the coating agent is improved. Further, the molten inorganic oxide is well dispersed in the coating layer 34 and localization of the molten inorganic oxide is reduced or eliminated. As a result, the coating layer 34 having a sufficiently high strength and sufficiently high thermal conductivity is easily obtained. The coating layer 34 having high thermal conductivity also easily enables sufficient burning and removing of PM in the outer portion of the honeycomb structure 21.

(7) It is preferred that the circularity of the cross-section of the molten inorganic oxide is about 0.9 or more. In this case, the molten inorganic oxide having satisfactory rolling characteristics is easily obtained. As a result, the applicability of the coating agent to the outer surface of the ceramic structure 23 is further improved.

(8) When a plurality of porous ceramic members 22, each having a predetermined shape (a square cross-sectional shape or a substantially triangular cross-sectional shape), are prepared (formed by extrusion molding) in advance and the porous ceramic members 22 are joined together using a bonding agent to manufacture the ceramic structure 23, the process for cutting the outer circumferential portion of the ceramic structure 23 is eliminated. In this manner, the manufacturing processes of the ceramic structure 23 are simplified. However, in this case, without the final cutting process, recessions and projections may remain on the outer circumferential portion of the ceramic structure 23 and the ceramic structure 23 may have an unevenly shaped outer portion. To ensure sufficient high exhaust gas purification efficiency, the thickness of the coating layer 34 needs to be accurately adjusted taking into consideration such recesses and projections (level differences). The coating agent, which can be applied uniformly to the outer circumferential portion of the ceramic structure 23, effectively improves the accuracy of the thickness of the coating layer 34. The honeycomb structure 21 obtained with this manufacturing method also easily ensures a sufficiently high purification efficiency.

(9) It is preferred that the average particle diameter of the ceramics particles be 10 μm or less. In this case, the ceramics particles can easily enter the ceramic structure 23, and the anchor effect of the ceramics particles is improved. As a result, the adhesiveness of the coating layer 34 to the ceramic structure 23 is effectively improved.

(10) The composition of the bonding agent is the same as the composition of the coating agent. Thus, the applicability of the bonding agent to the outer surface of the porous ceramic members 22 is sufficiently high, and the bonding agent layer 24 is easily prevented from peeling and corroding.

The preferred embodiment may be modified as described below.

The coating agent may additionally contain inorganic fibers as long as this does not affect the superior effects of the coating agent described above. Examples of the inorganic fibers include ceramic fibers such as silica-alumina fibers, mullite fibers, alumina fibers, and silica fibers. These different kinds of inorganic fibers may be used solely or two or more of these kinds may be used in combination.

In the preferred embodiment, the honeycomb structure 21 has a circular cross-section. However, the cross-section is not limited in such a manner. That is, the honeycomb structure 21 may have an oval cross-section or a polygonal cross-section such as a substantially triangular cross-section (race track shape), a hexagonal cross-section, or an octagonal cross-section.

In the preferred embodiment, the ceramic structure 23 is formed by the plurality of porous ceramic members 22. However, the ceramic structure 23 is not limited to this structure. A ceramic structure formed by extrusion molding or cutting a single porous ceramic member (monolithic porous ceramic member) may be used. In this case, the bonding agent layer 24 is removed. This simplifies the structure and the manufacturing processes of the ceramic structure 23.

In the preferred embodiment, the coating agent and the bonding agent have the same compositions. However, the coating agent and the bonding agent do not have to have the same compositions. For example, the bonding agent does not have to contain the inorganic binder and the inorganic binder may be contained in only the coating agent.

In the preferred embodiment, PM is burned and removed by the heat of the exhaust gas. However, PM may be burned and removed by a heating means, such as a heater or a burner, arranged in the exhaust gas purification device 10.

In the preferred embodiment, PM is burned and removed in the honeycomb structure 21 formed by the ceramic structure 23 having two end surfaces, one of which is sealed by the plugs 30. However, the honeycomb structure 21 may be formed by a ceramic structure 23 having end surfaces that are not sealed and being used as a catalyst carrier (may also be referred to as a honeycomb catalyst) carrying a catalyst such as an oxidation catalyst.

The present invention further provides a coating agent that is applied to an outer surface of a ceramic structure and contains a molten inorganic oxide as a main component and additionally contains a binder and a solvent. The coating agent ensures sufficiently high applicability to the outer surface of the ceramic structure and easily prevents a coating layer from peeling and corroding.

Examples and comparative examples will now be discussed.

<Manufacturing of the Honeycomb Structure>

First, 7000 wt % of alpha silicon carbide particles having an average particle diameter of 10 μm and 3000 wt % of alpha silicon carbide particles having an average particle diameter of 0.5 μm were wet mixed. Then, 570 wt % of an organic binder (methyl cellulose) and 1770 wt % of water were added to 10000 wt % of the resulting mixture and kneaded to form a mixed composition. Further, 330 wt % of a reversible agent (UNILUB (registered trademark) manufactured by NOF CORPORATION) and 150 wt % of a lubricant agent (glycerin) were added to the mixed composition and then kneaded and subjected to extrusion molding to form a structured body having a rectangular pillar shape as shown in FIG. 3.

Next, the structured body was dried using a microwave drying apparatus or the like to obtain a dried ceramic body. A plug paste having the same composition as the structured body was filled into the openings of predetermined cells. After the paste was dried with a drying apparatus, the dried ceramic body was degreased at 400° C. and fired for three hours in an argon atmosphere at 2200° C. under normal pressure to obtain a porous ceramic member 22 (FIG. 3) that is formed by a sintered body of silicon carbide. The porous ceramic member 22 has the dimensions of 34.3×34.3×150 mm (height×width×length), a cell density of 240 cells per square inch (cpsi), and a cell partition thickness of 0.25 mm.

Figure 5:
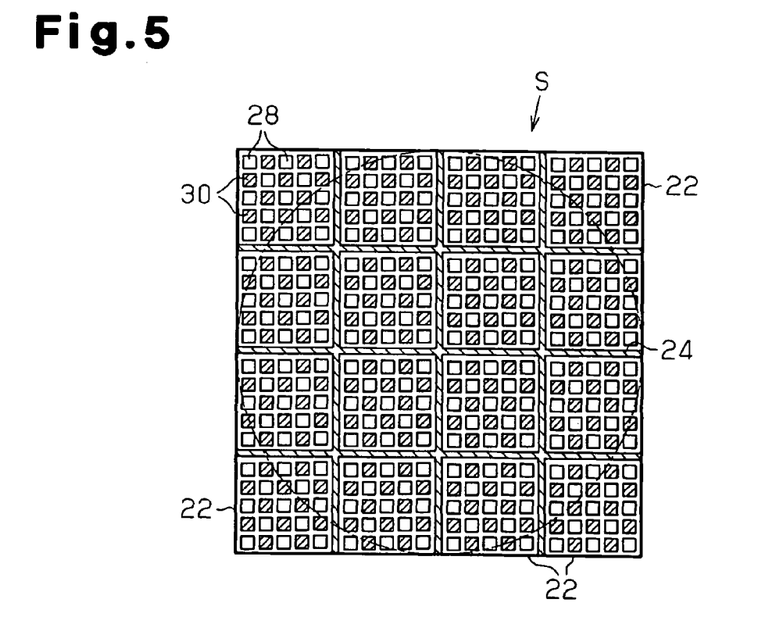
FIG. 5 is a vertical cross-sectional view showing an aggregation of porous ceramic members according to one embodiment of the present invention.

Sixteen (4 by 4) porous ceramic members 22 were bonded with a bonding agent into an aggregation S (refer to FIG. 5). The aggregation S was then dried for one hour at 100° C. to harden the bonding agent. When the bonding agent was hardened, the aggregation S integrated by the bonding agent layer 24 having a thickness of 1 mm was obtained.

The aggregation S was cut with a diamond cutter to obtain a honeycomb block having a cylindrical shape with a diameter of 142 mm.

Next, the coating agents shown in Table 1 were prepared.

A coating layer 34 was formed by applying the coating agent of each example to the outer surface of the honeycomb block. The coating layer 34 was dried at 120° C. and hardened. As a result, a cylindrical honeycomb structure 21 having a diameter of 143.8 mm and a length of 150 mm was obtained.

EXAMPLES 1 TO 22 AND COMPARATIVE EXAMPLES 1 TO 8

<Preparation of Coating Agent>

First, the components shown in Table 1 were kneaded for 30 minutes using a mixer to prepare the coating agent of each example. The coating agent of each example was then subjected to the evaluation measurement described below. The results are shown in Table 1. The "overall evaluation" in Table 1 is expressed using one of the categories described below.

Torus (◎)

"no air-bubbles", "bending strength was 7 kgf or more", and "no corrosion was observed".

Circle (○)

"one or two air-bubbles were formed", "bending strength was 7 kgf or more", and "no corrosion was observed"; or "no air-bubbles were formed", "bending strength was 6 kgf or more and less than 7 kgf", and "no corrosion was observed".

Triangle (Δ)

"three or four air-bubbles were formed", "bending strength was 9 kgf or more", and "no corrosion was observed"; or "no air-bubbles were formed", "bending strength was 4 kgf or more and less than 6 kgf", and "no corrosion was observed".

Cross (x)

"three or more air-bubbles were formed" and "corrosion was observed";

"seven or more air-bubbles were formed" and "no corrosion was observed"; or

"three or four air-bubbles were formed", "bending strength was less than 9 kgf", and "no corrosion was observed".

<Evaluation of Applicability of the Coating Agent>

The coating agent of each example was applied to the outer surface of the ceramic structure to manufacture a honeycomb structure. The coating layer of the honeycomb structure of each example was formed to have an average thickness of 0.2 mm. To evaluate the applicability of the coating agent, the number of air-bubbles per unit area (10 cm$^2$) of the coating layer of the honeycomb structure of each example was measured using an industrial microscope (TMM-100D manufactured by TOPCON TECHNOHOUSE CORPORATION). In this evaluation, a smaller number of air-bubbles formed in the coating layer indicates that the coating agent is applied more uniformly and the coating agent has better applicability. In the present specification, an "air-bubble" refers to a cavity having a diameter of 0.5 mm or more and a depth of 0.2 mm or more formed in the coating layer (portion in the coating layer where the coating agent does not exist).

<Measurement of Bending Strength of Coating Agent Layer>

To evaluate the adhesiveness of the coating layer (unlikelihood of peeling of the coating layer), the bending strength of the coating layer was measured. First, a pair of substrates (34×34×25 mm) having the same composition as the ceramic structure used in the preferred embodiment was prepared. The two substrates were bonded using the coating agent of each example to obtain a predetermined test sample. The thickness of the coating layer in the direction in which the two substrates were arranged was 1 mm. The bending strength of the coating layer was measured using a three-point bending test method that complies with JIS-R-1601. The crosshead speed in the three-point bending test method was 1 mm/min. The entire contents of JIS-R-1601 are incorporated herein by reference.

<Corrosion of the Coating Layer>

(1) Observation with an Electron Scanning Microscope

First, a pellet having a predetermined shape (30×25×5 mm) was prepared using the coating agent of each example. The cross-section of the pellet was photographed with an electron scanning microscope. An average particle diameter R1 for molten inorganic oxide particles randomly selected from the photograph was calculated. The pellet was then immersed in a 0.2N potassium hydroxide (KOH) solution for one hour. The KOH solution containing an inorganic element (potassium), which is contained in soot from exhaust gas, was used as an alternative to the soot from the exhaust gas.

Next, the pellet was dried at 100° C. and heated in an atmosphere of 900° C. for 10 hours. The cross-section of the heated pellet was photographed with the electron scanning microscope in the same manner as described above. An average particle diameter R2 for molten inorganic oxide particles randomly selected from the photograph was calculated. As a result, when the change rate of the average particle diameter R2 of the molten inorganic oxide particles after heat treatment relative to the average particle diameter R1 for the molten inorganic oxide particles before heat treatment was 50% or more, the coating layer was determined as corroding.

(2) Observation With X-Ray Diffraction (XRD) Method

The pellet after heat treatment was also analyzed with the X-ray diffraction (XRD) method to determine whether the coating layer corroded in addition to the determination using the electron scanning microscope described above. For pellets containing silica (molten silica or crushed silica) as the main component (examples 1 to 10 and 21 and 22 and comparative examples 1 to 3), the pellet was determined as corroding when half the width of the diffraction peak of $SiO_2$ (tridymite) or $SiO_2$ (quartz) changed after the heat treatment. For pellets containing inorganic particles other than silica as the main component (examples 11 to 20 and comparative examples 4 to 8), the corrosion determination was performed in the same manner as described above.

<Measurement of Heat Conductivity of Coating Layer>

The thermal conductivity of the coating layer of the honeycomb filter of each example was calculated using a laser flash method.

TABLE 1

| | Ingredients of coating agent | | | | | | | |
|---|---|---|---|---|---|---|---|---|
| | inorganic particle | | | silicon carbide (ave. diameter 0.5 μm) | | | | inorganic fiber (length 100 μm, diameter 10 μm) |
| | kind | content (mass %) | ave. diameter (μm) | | silica sol content (mass %) | CMC | electrolyzed water | |
| Example 1 | molten silica | 58 | 20 | 10 | 13 | 1 | 18 | — |
| Example 2 | molten silica | 58 | 30 | 10 | 13 | 1 | 18 | — |
| Example 3 | molten silica | 58 | 40 | 10 | 13 | 1 | 18 | — |
| Example 4 | molten silica | 58 | 50 | 10 | 13 | 1 | 18 | — |
| Example 5 | molten silica | 58 | 60 | 10 | 13 | 1 | 18 | — |
| Example 6 | molten silica | 68 | 40 | 0 | 13 | 1 | 18 | — |
| Example 7 | molten silica | 65 | 40 | 3 | 13 | 1 | 18 | — |
| Example 8 | molten silica | 63 | 40 | 5 | 13 | 1 | 18 | — |
| Example 9 | molten silica | 61 | 40 | 7 | 13 | 1 | 18 | — |
| Example 10 | molten silica | 40 | 40 | 28 | 13 | 1 | 18 | — |
| Example 11 | molten alumina | 58 | 20 | 10 | 13 | 1 | 18 | — |
| Example 12 | molten alumina | 58 | 30 | 10 | 13 | 1 | 18 | — |
| Example 13 | molten alumina | 58 | 40 | 10 | 13 | 1 | 18 | — |
| Example 14 | molten alumina | 58 | 50 | 10 | 13 | 1 | 18 | — |
| Example 15 | molten alumina | 58 | 60 | 10 | 13 | 1 | 18 | — |
| Example 16 | molten alumina | 68 | 40 | 0 | 13 | 1 | 18 | — |
| Example 17 | molten alumina | 65 | 40 | 3 | 13 | 1 | 18 | — |
| Example 18 | molten alumina | 63 | 40 | 5 | 13 | 1 | 18 | — |
| Example 19 | molten alumina | 61 | 40 | 7 | 13 | 1 | 18 | — |
| Example 20 | molten alumina | 40 | 40 | 28 | 13 | 1 | 18 | — |
| Example 21 | molten silica | 71 | 40 | 0 | 10 | 1 | 18 | — |
| Example 22 | molten silica | 35 | 40 | 33 | 13 | 1 | 18 | — |
| Comp. Ex. 1 | crushed silica | 63 | 40 | 5 | 13 | 1 | 18 | — |
| Comp. Ex. 2 | crushed silica | 58 | 40 | 10 | 13 | 1 | 18 | — |
| Comp. Ex. 3 | crushed silica | 40 | 40 | 28 | 13 | 1 | 18 | — |
| Comp. Ex. 4 | crushed alumina | 63 | 40 | 5 | 13 | 1 | 18 | — |
| Comp. Ex. 5 | crushed alumina | 58 | 40 | 10 | 13 | 1 | 18 | — |
| Comp. Ex. 6 | crushed alumina | 40 | 40 | 28 | 13 | 1 | 18 | — |
| Comp. Ex. 7 | alumina fiber | 40 | — | 30 | 22 | 1 | 7 | alumina fiber |
| Comp. Ex. 8 | silicon carbide | 58 | 40 | 10 | 13 | 1 | 18 | — |

| Ingredients of coating layer | | | Evaluation | | | | |
|---|---|---|---|---|---|---|---|
| inorganic particle content (mass %) | silicon carbide | silica sol | air-bubbles amount (/10 cm²) | bending strength (kgf) | corrosion | thermal conductivity (W/mK) | total evaluatuon |

TABLE 1-continued

|  |  |  |  |  |  |  |  |  |
|---|---|---|---|---|---|---|---|---|
| Example 1 | 81 | 14 | 5 | 2 | 10.2 | No | 0.42 | ○ |
| Example 2 | 81 | 14 | 5 | 1 | 9.5 | No | 0.41 | ○ |
| Example 3 | 81 | 14 | 5 | 0 | 8.6 | No | 0.41 | ⊚ |
| Example 4 | 81 | 14 | 5 | 0 | 7.2 | No | 0.39 | ⊚ |
| Example 5 | 81 | 14 | 5 | 0 | 6.3 | No | 0.34 | ○ |
| Example 6 | 95 | 0 | 5 | 0 | 6.8 | No | 0.35 | ○ |
| Example 7 | 90 | 4 | 5 | 0 | 7.9 | No | 0.36 | ⊚ |
| Example 8 | 88 | 7 | 5 | 0 | 7.5 | No | 0.37 | ⊚ |
| Example 9 | 85 | 10 | 5 | 1 | 8.0 | No | 0.39 | ○ |
| Example 10 | 56 | 39 | 5 | 2 | 9.1 | No | 0.43 | ○ |
| Example 11 | 81 | 14 | 5 | 2 | 9.8 | No | 0.42 | ○ |
| Example 12 | 81 | 14 | 5 | 2 | 9.3 | No | 0.40 | ○ |
| Example 13 | 81 | 14 | 5 | 0 | 8.3 | No | 0.40 | ⊚ |
| Example 14 | 81 | 14 | 5 | 0 | 7.0 | No | 0.38 | ⊚ |
| Example 15 | 81 | 14 | 5 | 0 | 6.1 | No | 0.32 | ○ |
| Example 16 | 95 | 0 | 5 | 0 | 6.3 | No | 0.36 | ○ |
| Example 17 | 90 | 4 | 5 | 0 | 7.5 | No | 0.35 | ⊚ |
| Example 18 | 88 | 7 | 5 | 0 | 7.3 | No | 0.37 | ⊚ |
| Example 19 | 85 | 10 | 5 | 1 | 7.7 | No | 0.40 | ○ |
| Example 20 | 56 | 39 | 5 | 2 | 8.9 | No | 0.42 | ○ |
| Example 21 | 96 | 0 | 4 | 0 | 4.4 | No | 0.33 | △ |
| Example 22 | 49 | 46 | 5 | 4 | 10.3 | No | 0.45 | △ |
| Comp. Ex. 1 | 88 | 7 | 5 | 4 | 5.6 | Yes | 0.34 | X |
| Comp. Ex. 2 | 81 | 14 | 5 | 5 | 5.9 | Yes | 0.37 | X |
| Comp. Ex. 3 | 56 | 39 | 5 | 5 | 7.5 | Yes | 0.39 | X |
| Comp. Ex. 4 | 88 | 7 | 5 | 4 | 5.5 | Yes | 0.32 | X |
| Comp. Ex. 5 | 81 | 14 | 5 | 4 | 5.6 | Yes | 0.36 | X |
| Comp. Ex. 6 | 56 | 39 | 5 | 6 | 7.4 | Yes | 0.38 | X |
| Comp. Ex. 7 | 52 | 39 | 5 | 9 | 10.1 | No | 0.38 | X |
| Comp. Ex. 8 | 81 | 14 | 5 | 4 | 8.3 | No | 0.47 | X |

As is apparent from Table 1, the coating agent and the coating layer contain the molten inorganic oxide as the main component in examples 1 to 22. Thus, the overall evaluations were "torus", "circle", or "triangle" and satisfactory results were obtained in the various evaluations of the coating agent and the coating layer. More specifically, the coating agent had satisfactory applicability, the number of air-bubbles formed in the coating layer was four or less, the bending strength of the coating layer was 4 kgf or more, and no corrosion was observed in the coating layer. It is believed that this is because the molten inorganic oxide contained as the main component of the coating agent and the coating layer causes the coating agent to spread well and suppresses a reduction reaction occurring between the coating agent and the soot from the exhaust gas.

Among these examples, in examples 1 to 20, the coating agent contains a predetermined amount (about 40 to about 70 mass %) of molten inorganic oxide as inorganic particles, and the coating layer contains a predetermined amount (about 55 to about 95 mass %) of molten inorganic oxide as inorganic particles. Thus, the overall evaluations were "torus" or "circle" and further satisfactory results were obtained with regard to the applicability of the coating agent and the bonding strength of the coating layer. It is believed that this is because the predetermined amount of molten inorganic oxide contained in the coating agent and the coating layer improves the dispersibility of the molten inorganic oxide in the coating agent and the coating layer.

For example 21, the bending strength of the coating layer is low because the coating agent and the coating layer have excessively large contents of the molten inorganic oxide. However, air-bubbles were not formed in the coating layer and no corrosion was observed in the coating layer. For example 22, four air-bubbles were formed because the coating agent and the coating layer do not have sufficiently large contents of molten inorganic oxide. However, the bending strength of the coating layer was sufficiently high and no corrosion was observed in the coating layer.

For comparative examples 1 to 6, the applicability of the coating agent is low, air-bubbles are formed in the coating layer, and corrosion is also observed in the coating layer. It is believed that this is because the coating agent and the coating layer contain as the main component crushed inorganic particles (crushed silica or crushed alumina) that have rough surfaces and uneven shapes and that are likely to have a reduction reaction with the soot from the exhaust gas.

For comparative example 7, no corrosion was observed and the bending strength of the coating layer was sufficient. However, many air-bubbles were formed in the coating layer. It is believed that this is because the coating agent contains as the main component inorganic fibers (alumina fibers) that have low compatibility with the solvent. This lowers the applicability of the coating agent and form many air-bubbles in the coating layer.

For comparative example 8, air-bubble formation in the coating layer was suppressed and no corrosion was observed in the coating layer. However, the bending strength of the coating layer was lower than example 22. It is believed that this is because the coating agent contains as the main component hydrophobic silicon carbide that has extremely low compatibility with the solvent. This decreases the dispersibility of inorganic particles in the coating agent.

When compared with example 22 in which the main component is molten inorganic oxide, comparative example 7 has a larger number of air-bubbles. Accordingly, it is believed that hydrophobic inorganic elements (alumina fibers) greatly affect the applicability of the coating agent and the shape of the inorganic elements also affects the applicability of the coating agent. It is believed that such hydrophobic inorganic elements increase the number of air-bubbles formed in the coating layer. Although the above examples use molten silica and molten alumina, the same effects are expected when molten zirconia or molten titania is used.

The present examples and embodiments are to be considered as illustrative and not restrictive, and the invention is not to be limited to the details given herein, but may be modified within the scope and equivalence of the appended claims.

What is claimed is:

1. A honeycomb structure having a longitudinal axis, comprising:
   a ceramic structure extending along the longitudinal axis and having a large number of cells partitioned by a partition; and
   a coating layer arranged on an outer surface of the ceramic structure, wherein the coating layer contains about 55 to about 95 mass % of solid molten inorganic oxide particles, each particle having a cross-section with circularity of about 0.9 or more.

2. The honeycomb structure according to claim 1, wherein the solid molten inorganic oxide particles comprise one selected from the group consisting of molten silica, molten alumina, molten titania, and molten zirconia.

3. The honeycomb structure according to claim 2, wherein the solid molten inorganic oxide particles comprise at least either one of molten silica and molten alumina.

4. The honeycomb structure according to claim 1, wherein the solid molten inorganic oxide particles have an average particle diameter of about 20 to about 100 μm.

5. The honeycomb structure according to claim 1, wherein the ceramic structure includes a plurality of porous ceramic members joined together by a bonding agent layer.

6. The honeycomb structure according to claim 1, wherein the ceramic structure is formed from a single porous ceramic member.

7. The honeycomb structure according to claim 1, wherein the ceramic structure is formed by bonding with a bonding agent a first plurality of porous ceramic members for forming a central portion of the ceramic structure and a second plurality of porous ceramic members for forming an outer portion of the ceramic structure.

8. The honeycomb structure according to claim 1, wherein the ceramic structure has two end surfaces, wherein each cell has openings in the two end surfaces, with one of the openings in each cell being sealed, and the partition functions as a particle capturing filter.

* * * * *